(12) United States Patent
Clapp

(10) Patent No.: US 8,051,935 B2
(45) Date of Patent: Nov. 8, 2011

(54) HOVERCRAFT AND METHODS OF MANUFACTURE AND USE OF SAME

(75) Inventor: William G. Clapp, North Ogden, UT (US)

(73) Assignee: Weber State University, Ogden, UT (US)

( * ) Notice: Subject to any disclaimer, the term of this patent is extended or adjusted under 35 U.S.C. 154(b) by 392 days.

(21) Appl. No.: 12/165,981

(22) Filed: Jul. 1, 2008

(65) Prior Publication Data

US 2010/0000817 A1 Jan. 7, 2010

(51) Int. Cl.
*B60K 28/10* (2006.01)

(52) U.S. Cl. ........ 180/117; 180/274; 180/311; 180/271; 180/116; 280/782; 280/798; 296/187.05; 296/187.06; 293/107

(58) Field of Classification Search .......... 180/116–122, 180/271, 274, 311; 280/782, 798; 296/187.05, 296/187.06; 293/107
See application file for complete search history.

(56) References Cited

U.S. PATENT DOCUMENTS

| | | | | | |
|---|---|---|---|---|---|
| 3,078,939 | A | * | 2/1963 | Bollum, Sr. | 180/117 |
| 3,115,862 | A | * | 12/1963 | Underwood, Jr. | 116/266 |
| 3,465,844 | A | * | 9/1969 | Bannerman et al. | 180/118 |
| 3,810,522 | A | * | 5/1974 | Morgan et al. | 180/116 |
| 3,871,209 | A | * | 3/1975 | Hasha | 73/49.1 |
| 3,877,293 | A | * | 4/1975 | McKeage | 73/49.1 |
| 3,917,022 | A | * | 11/1975 | Brooks, Jr. | 180/127 |
| 3,968,851 | A | * | 7/1976 | Windt | 180/117 |
| 4,170,130 | A | * | 10/1979 | Borror et al. | 73/49.1 |
| 4,176,858 | A | * | 12/1979 | Kornhauser | 280/734 |
| 4,397,366 | A | * | 8/1983 | Eldridge et al. | 180/116 |
| 4,438,792 | A | * | 3/1984 | Timberlake, Jr. | 141/95 |
| 4,666,012 | A | * | 5/1987 | Howell et al. | 180/117 |
| 5,718,952 | A | * | 2/1998 | Zimmermann et al. | 428/34.1 |
| 5,831,149 | A | * | 11/1998 | Webb | 73/40.5 R |
| 5,931,248 | A | * | 8/1999 | Vickers et al. | 180/116 |
| 6,520,449 | B2 | * | 2/2003 | Illingworth | 244/12.1 |
| 6,561,301 | B1 | * | 5/2003 | Hattori et al. | 180/274 |
| 7,581,608 | B2 | * | 9/2009 | St. Louis | 180/116 |
| 7,823,683 | B2 | * | 11/2010 | Kiribayashi | 180/274 |
| 2006/0087417 | A1 | * | 4/2006 | Kiribayashi | 340/435 |
| 2006/0237255 | A1 | * | 10/2006 | Wanami et al. | 180/274 |
| 2007/0001470 | A1 | * | 1/2007 | Schwalm | 293/107 |
| 2007/0181359 | A1 | * | 8/2007 | Mader | 180/274 |
| 2007/0227797 | A1 | * | 10/2007 | Takahashi et al. | 180/274 |
| 2008/0238641 | A1 | * | 10/2008 | Mader | 340/436 |
| 2009/0020353 | A1 | * | 1/2009 | Kiribayashi | 180/274 |

OTHER PUBLICATIONS http://www.sb115103.50megs.com/catalog_2.html, Bobcat 2, site visited Jun. 2, 2008.

(Continued)

*Primary Examiner* — Anne Marie Boehler
*Assistant Examiner* — Michael Stabley
(74) *Attorney, Agent, or Firm* — TraskBritt

(57) ABSTRACT

An air-cushioned vehicle or hovercraft includes a three-dimensional frame comprising a latticework of tubular members. A pressure plate is coupled to the underside of the frame and includes at least one aperture therein and a skirt attached adjacent a periphery thereof. At least one lifting fan is positioned relative to the at least one aperture to generate a current of air therethrough. The frame may be configured to generate a visual indication of damage thereto. Methods of making and air-cushion vehicle are disclosed. Methods of using an air-cushion vehicle are also disclosed.

17 Claims, 3 Drawing Sheets

OTHER PUBLICATIONS http://www.wceruw.org/TEAM/Related_Problems/related_Problems_Hovercraf.html, Related Problems_Hovercraft, site visited Jun. 2, 2008.

http://www.sb115103.50megs.com/catalog.html, Bobcat 1, site visited Jun. 2, 2008.

* cited by examiner

HOVERCRAFT AND METHODS OF MANUFACTURE AND USE OF SAME

TECHNICAL FIELD

Embodiments of the invention relate generally to hovercraft, and particularly to hovercraft vehicles having easily removable parts and components on a frame of plastic tubular members, as well as to methods of hovercraft manufacture and use.

BACKGROUND

Military pilots are often required to intercept fast moving enemy vehicles, such as cars and trucks driving through a war zone or a secured area. Typically, these cars or trucks are traveling at speeds up to about 60 miles per hour. Such fast-moving targets are difficult for a pilot of a fighter jet to destroy. Unfortunately, providing pilot training and measuring weapon accuracy for such targets is difficult because of a lack of adequate low-cost practice targets. Currently, at least some U.S. Air Force bases use troop carriers, which have most of their parts removed so that nearly all that remains is the frame, wheels and body. These troop carriers are towed using a radio-controlled tank having a top speed of about 20 miles per hour, which is much lower than the speeds actually encountered with real enemy vehicles. Furthermore, it is difficult to confirm whether a troop carrier target has been hit during training. Indeed, even if the wheels of the troop carrier are blown off, the tank will continue to drag the target making it difficult for the pilot to determine whether the attack has been successful.

In order to provide a faster moving practice target, autonomous target vehicles have been produced. These autonomous target vehicles are capable of reaching speeds well over 60 miles per hour and may be controlled remotely, without the need to be towed. Such autonomous vehicles are typically constructed from conventional cars or trucks that are modified to make the vehicle completely autonomous. However, such autonomous vehicles are typically limited to well-prepared roads, which are uncommon in most pilot training ranges. Furthermore, the cost of even a well-used conventional car or truck plus the cost of the modifications to make the vehicle autonomous make such vehicles very expensive. Some have proposed armoring the critical components of such autonomous vehicles to protect those components from damage so that the components may be removed and possibly re-used after partial destruction. Such armoring not only adds to the cost of the vehicle, it is only protective for indirect hits. Indeed, many of these components will still be destroyed beyond re-use upon a direct hit.

BRIEF SUMMARY

Various embodiments of the present invention comprise hovercraft vehicles that are constructed of low-cost components and materials to provide a hovercraft that is easy to manufacture and less costly to replace upon its partial or complete destruction. In one or more embodiments, a hovercraft may comprise a frame. The frame may comprise a latticework of tubular members, and may be configured to generate a visual indicator of damage thereto when hit by ordnance. A pressure plate may be coupled to the frame. The pressure plate may comprise at least one aperture therein and a skirt attached adjacent a periphery thereof. At least one lifting fan may be positioned in operable relationship to the at least one aperture and to generate a current of air therethrough.

Other embodiments comprise methods of making a hovercraft, which may also be characterized as an air-cushion vehicle. One or more embodiments of such methods may comprise forming a frame comprised of a latticework of tubular members and/or configured to generate a visual indicator upon damage thereto. A pressure plate may be coupled to the frame and may include at least one aperture therein. A skirt may be attached to the pressure plate. At least one lifting fan may be positioned adjacent to the at least one aperture in the pressure plate.

Other embodiments comprise methods of using an air-cushion vehicle. One or more embodiments of such methods may comprise energizing at least one lifting fan supported by a frame of the vehicle. The lifting fan may be positioned and configured to generate a current of air through an aperture in a pressure plate. At least one propelling fan may also be energized. The at least one propelling fan may be configured to propel the air-cushion vehicle. Furthermore, a visual indicator may be generated responsive to damage of at least some portion of the frame.

DETAILED DESCRIPTION

The illustrations presented herein are, in some instances, not actual views of any particular air-cushioned vehicle, but are merely idealized representations which are employed to describe the present invention. Additionally, elements common between figures may retain the same numerical designation.

Figure 1:
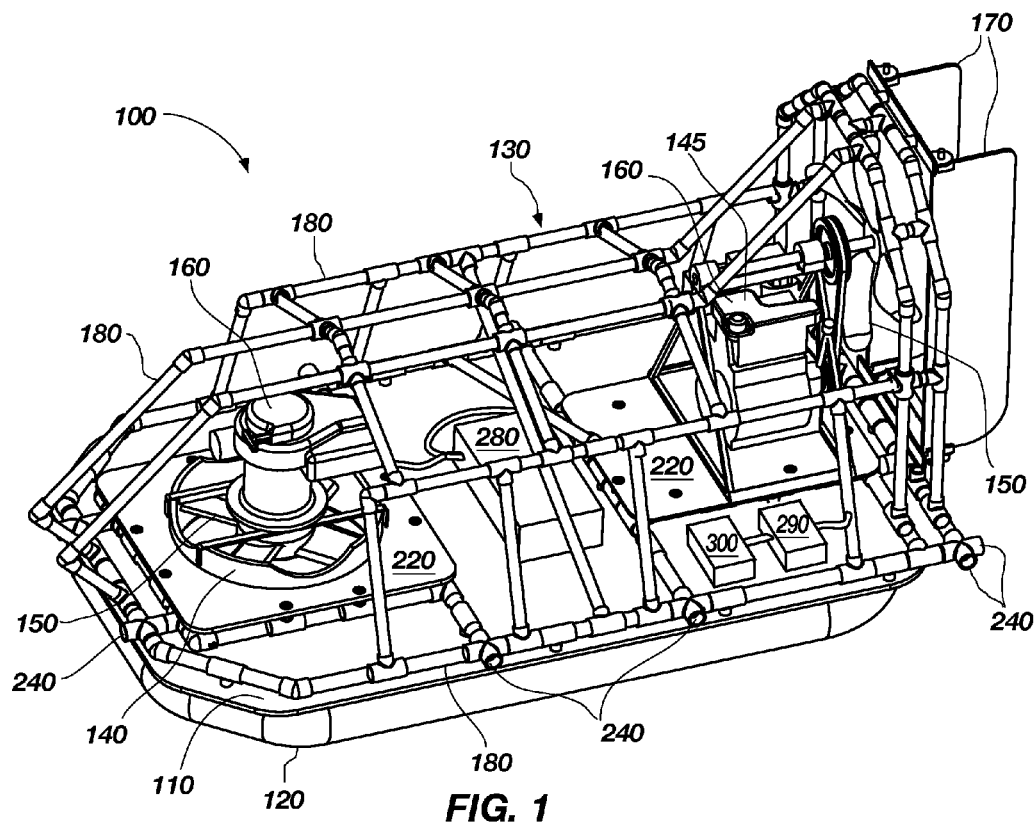
FIG. 1 illustrates an isometric view of a hovercraft according to one embodiment of the present invention.

Various embodiments of the present invention are directed toward air-cushioned vehicles, also referred to herein as a hovercraft. FIG. 1 illustrates an isometric view of a hovercraft 100 according to one embodiment of the present invention. The hovercraft 100 comprises a pressure plate 110 comprising at least one aperture therein. By way of example and not limitation, the pressure plate 110 may comprise wood, plastic, metal, a fiberglass laminate, a ceramic, or any other suitable material. A skirt 120 is attached to the pressure plate 110 generally adjacent a periphery thereof defining an air chamber below the pressure plate 110. Hovercraft skirts are well known to those of ordinary skill in the art and any known skirt configuration and material may be employed as skirt 120. A frame is coupled to the surface of the pressure plate 110 on an opposite surface thereof from the skirt 120.

The hovercraft 100 further includes at least one powered lifting fan 140 positioned relative to the at least one aperture to generate a current of air through the aperture and into the air chamber defined by the skirt 120. The air chamber, as defined by the pressure plate 110 and skirt 120, creates a positive air pressure acting on an underlying surface (ground, road, etc.) and provides an "air cushion" on which the hovercraft floats. The at least one lifting fan 140 may comprise any motor of sufficient power driving a fan with fan blades of a suitable number, size, shape, radius and pitch to blow adequate air into the air chamber to provide the necessary air cushion to keep the structure of the hovercraft above the skirt 120 from touching the ground over which it may ride. Some embodiments of hovercraft 100 may also include at least one propelling fan 145 positioned on the hovercraft 100 to produce a current of air flowing at least substantially parallel to the pressure plate 110. The at least one propelling fan 145 includes a drive motor of sufficient power driving a fan with fan blades of a suitable number, size, shape, radius and pitch to propel the hovercraft 100 laterally. In some embodiments, at least one rudder 170 may be positioned behind the at least one propelling fan 145 for steering the hovercraft 100 by directing the air stream generated by the propelling fan. In other embodiments, the at least one propelling fan 145 may be rotatably mounted to the hovercraft 100, for example about a vertical axis, so as to be capable of rotating from side to side across a suitable arc, for example 120°, to steer the hovercraft 100. In some embodiments, the at least one lifting fan 140 and/or the at least one propelling fan 145 may comprise a propeller 150 coupled to and driven by a motor 160, such as a gasoline engine or an electric motor. In some embodiments, a single motor 160 may be configured with a suitable drive train in the form of drive belts or gears to power a plurality, or all of, the lifting fans 140 and/or propelling fans 145. In other embodiments, at least some of the lifting fans 140 and/or propelling fans 145 may employ a separate motor 160.

Figure 2:
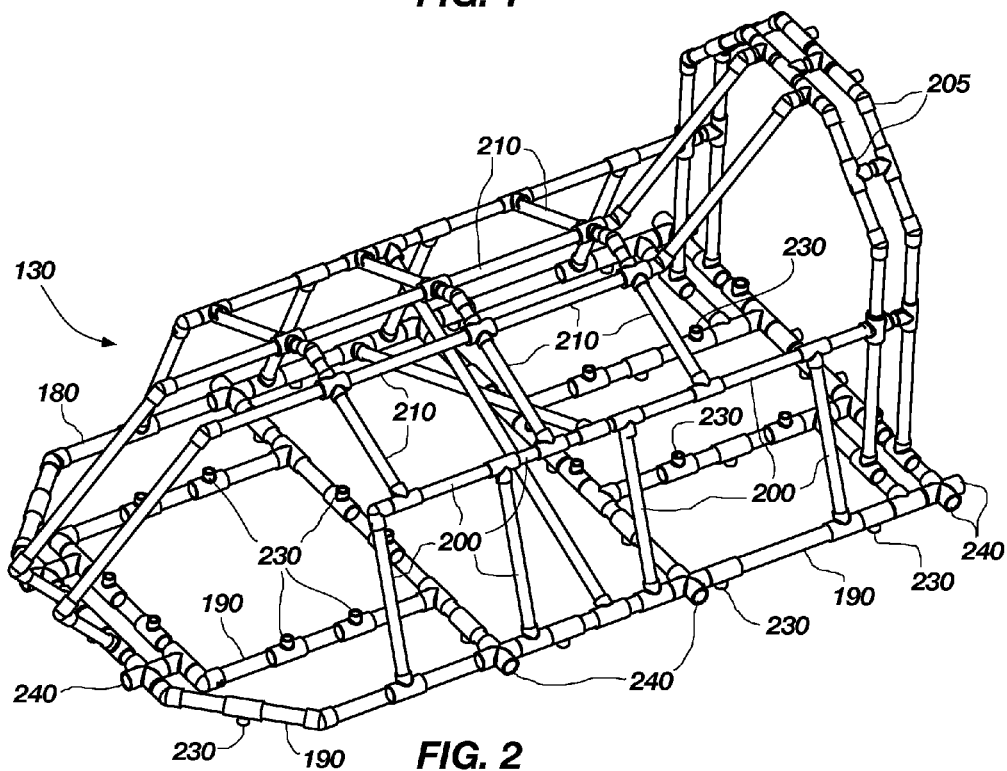
FIG. 2 illustrates a hovercraft frame according to one embodiment of the invention.

FIG. 2 illustrates a frame 130 according to one embodiment of the invention. The frame 130 may comprise a plurality of tubular members 180. The plurality of tubular members 180 may comprise relatively low cost materials assembled and configured to provide adequate structural support. In some embodiments, the plurality of tubular members 180 may comprise a material such as a plastic, a metal, a metal alloy, or combinations thereof. By way of example and not limitation, the tubular members 180 may comprise polyvinyl chloride (PVC) pipe. Such PVC pipe is readily commercially available off the shelf and is relatively low in cost.

In embodiments comprising tubular members 180, the frame may be assembled from various pipe sections, couplings and other fittings of suitable sizes and configurations. The tubular members 180 may be assembled and bonded together with the couplings and other fittings using, for example, an adhesive to comprise a three-dimensional latticework extending over at least a portion of the pressure plate 110. In some embodiments, the latticework may comprise a frame base 190 configured to be attached to the pressure plate 110. The base 190 may further include tubular members 180 configured to provide support for the one or more lifting fans 140 as well as other components mounted thereon. A sidewall lattice 200 may be coupled to at least a portion of each longitudinal side of the base 190. The sidewall lattice 200 may extend upward and away from the base 190 forming a sidewall envelope of sorts, except that the lattice structure has openings or gaps between the tubular members 180. A central lattice 210 may be coupled to and extend between the sidewall lattices 200 on each longitudinal side of the base 190. The central lattice 210 is vertically offset from the base 190 and may be generally coupled with the upper portions of the sidewall lattices 200. Furthermore, a propeller frame lattice 205 may be positioned at the rear of the frame 130 and configured to peripherally surround the propeller 150 of the propelling fan 145. In embodiments comprising a propeller frame lattice 205, the propeller frame lattice 205 may be configured so that the frame 130 may be stored upright (e.g., in a vertical position substantially 90° from its normal, operational position), with the frame 130 supported by the propeller frame lattice 205. The frame 130 may be stored in such an upright position with the pressure plate 110 and the skirt 120 attached thereto.

Figure 3:
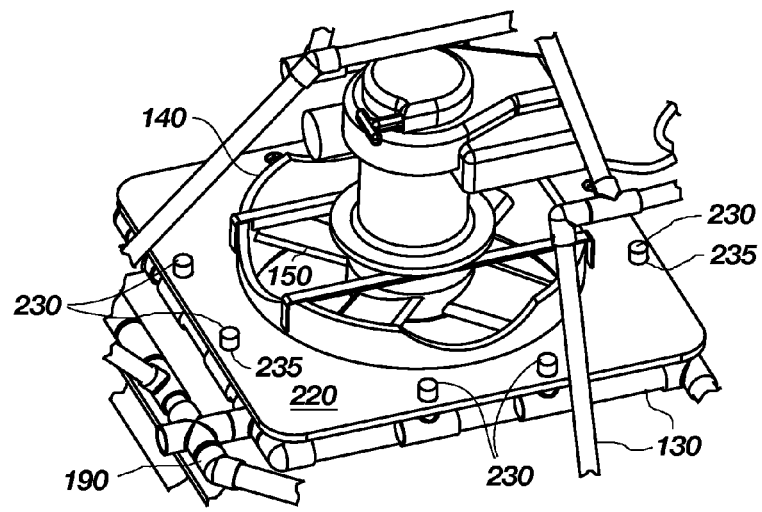
FIG. 3 is an enlarged view of a lifting fan and mounting surface according to one embodiment.

As described above, in some embodiments the one or more lifting fans 140 and propelling fans 145 may be mounted to the frame 130. FIG. 3 is an enlarged view of the lifting fan 140 and mounting surface 220 therefor according to one embodiment. A lifting fan 140 and or a propelling fan 145 may be mounted to a mounting surface 220, which may comprise a separate portion of pressure plate 110 and include the at least one aperture therein, as well as a fan shroud as shown, the mounting surface 220 being supported by and coupled to a portion of the frame 130 using a plurality of quick connects 230. The quick connects 230 may comprise conventional threaded tee connectors, with the threaded portion extending through apertures 235 in the mounting surface 220. Such conventional threaded tee connectors are available at most hardware and sprinkler supply stores. Therefore, the mounting surface 220 may be mounted to the frame 130 by aligning a plurality of apertures 235 in the mounting surface 220 with the threaded portion of a plurality of quick connects 230. The threaded portion of the quick connects 230 may then be capped with a conventional screw cap or plug, also available in most hardware and sprinkler supply stores. The screw cap has a larger outer diameter than the diameter of the plurality of apertures 235 and, therefore, locks the mounting surface 220 into place. The mounting surface 220 may, therefore, be easily removed by unscrewing the screw caps and removing the mounting surface 220 from the frame 130. Such quick connects 230 may allow the one or more lifting fans 140 and propelling fans 145, as well as other components, to be easily removed for storage, repair or replacement as well as for salvaging parts if some other, substantial portion of the hovercraft 100 is damaged or destroyed beyond use, etc.

In addition, such quick connects 230 (see FIG. 2) may also be used for attaching the frame 130 to the pressure plate 110 by mounting the frame 130 with the threaded portion of a plurality of quick connects 230 passing through apertures in the pressure plate 110. Screw caps or plugs are similarly screwed onto the threaded portions of the quick connects 230 from the other side of the pressure plate 110 to secure the pressure plate 110 and the frame 130 together.

Returning to FIG. 1, some embodiments of the hovercraft 100 may comprise a plurality of connecting points 240 at specific points of the frame 130. The connecting points 240 are configured so that one or more additional components may be attached to the frame 130. In embodiments in which the frame 130 comprises tubular members 180, the connecting points 240 may comprise conventional tee connectors, cross connectors, or combinations thereof to which one or more additional components may be attached. In some embodiments, such tee connectors or cross connectors may comprise quick connecting and lockable connectors such as the Watts Quick-Connect Solutions by Watts Water Technologies, Inc. of North Andover, Mass., or conventional threaded tee connectors or cross connectors.

Figure 4:
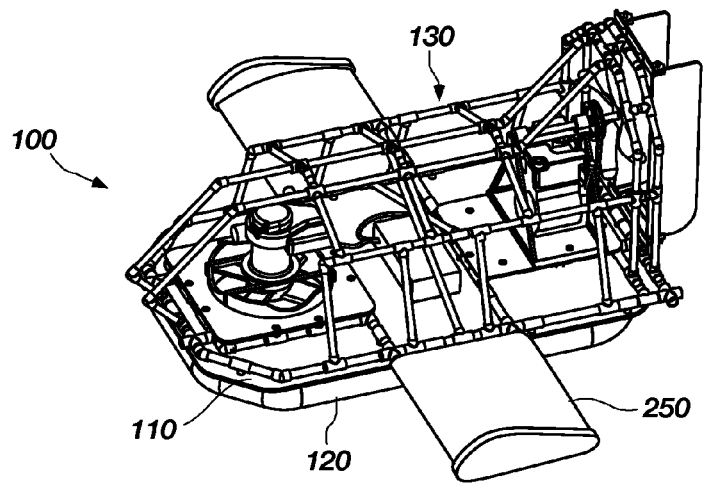
FIG. 4 illustrates a hovercraft comprising wings according to an embodiment of the present invention.
Figure 5:
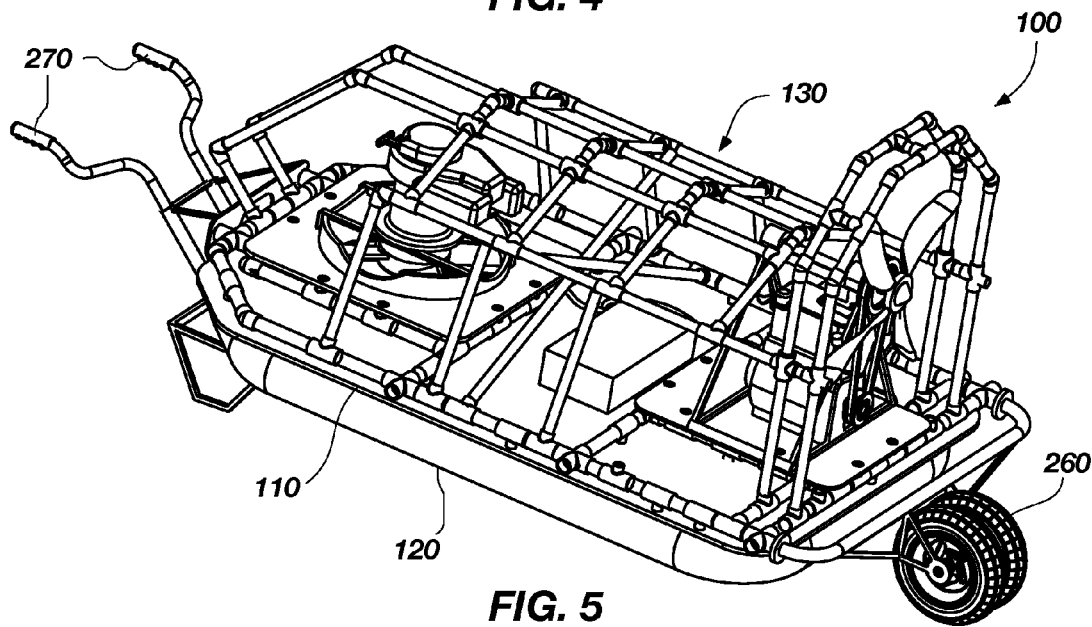
FIG. 5 shows a hovercraft according to one embodiment comprising one or more wheels and one or more handles attached to the frame at connecting points.

Some non limiting examples of additional components which may be attached using one or more of the plurality of connecting points 240 may include wheels, handles, wings, pontoons, silhouette side panels to simulate a particular vehicle silhouette (truck, car, personnel carrier, tank, etc.), etc. By way of example, FIG. 4 illustrates a hovercraft 100 according to an embodiment of the present invention comprising wings 250. Such wings may be attached to the frame 130 at connecting points 240. In some embodiments, as illustrated in FIG. 5, one or more wheels 260 and one or more handles 270 may be attached to the frame at connecting points 240 for manually moving the hovercraft 100. Although the embodiment in FIG. 5 shows a single wheel 260 attached to the rear of the frame 130, it will be apparent to those of ordinary skill in the art that additional wheels 260 may be attached to the sides of the frame 130 to reduce the amount of weight lifted by a person lifting from the handles 270, as well as in other configurations.

In some embodiments of the present invention, the hovercraft 100 may be configured to be remotely controlled, as by radiofrequency signals. In such embodiments, the hovercraft 100 may include an electronic control system 280 configured to control the one or more fans 140, as well as the one or more rudders 170 (or rotation of a rotatably mounted propelling fan 145) from input received from a remote location. By way of example and not limitation, the electronic control systems may enable the remote controller to start and stop the one or more fans 140, adjust the speed of one or more of the one or more fans 140, and/or adjust the rotation of the one or more rudders 170. The electronic control system 280 may include one or more electric servomotors coupled to the throttle and the choke of each of the one or more fans 140 as well as one or more electric servomotors coupled to the one or more rudders 170. Upon receipt of an input or communication from the remote controller, an electric servomotor may be energized to adjust the component to which it is coupled. For example, upon a specific input from the remote controller to increase the speed of the hovercraft 100, an electric servomotor coupled to a throttle of the at least one propelling fan 145 may be energized to increase the throttle to the at least one propelling fan 145. Similarly, upon a specific input from the remote controller to turn the hovercraft 100 to the left, an electric servomotor coupled to the rudder 170 may be energized to rotate the rudder 170 to the left.

In some embodiments of the invention, the frame 130 may be configured to generate a visual indicator upon damage thereto. By way of example and not limitation, in embodiments in which the frame 130 comprises a plurality of tubular members 180 coupled to form a lattice covering at least a portion of the pressure plate, the interior volume of the plurality of tubular members 180 may be operably coupled to a pressure transducer 290 and may include a pressurized fluid therein, for example compressed air or an inert gas such as nitrogen. Upon damage to the frame 130, the pressurized fluid within the tubular members 180 comprising the frame 130 is released from the tubular members 180, causing the pressure within the frame 130 to drop. The pressure transducer 290 is configured to detect the change in the pressure and to activate a visual indicator device 300 upon a pressure change beyond a specified amount. The visual indicator device 300 is configured to generate the visual indicator when activated. By way of example and not limitation, the visual indicator device 300 may comprise a smoke bomb, a flame generator, one or more lights, an explosive device, a fan turn-off switch or combinations thereof. Examples of visual indicators generated by such visual indicator devices 300 may, therefore, include smoke, fire, flashing and/or solid light, an explosion, termination of the one or more fans 140, or combinations thereof. A radio signal indicating a hit may also be generated in association with the visual signal for remote, real-time tracking of the target practice run.

Any one of a variety of methods may be employed to pressurize the plurality of tubular members 180. By way of example and not limitation, a tank filled with compressed air may be included on the hovercraft 100 and coupled to the frame 130 to pressurize the air therein. In another example, the frame 130 may be pressurized by including a valve at one point of the frame 130 to which an air compressor or a tank with some compressed fluid may be connected to the frame 130 to compress the fluid therein. Once the frame 130 is compressed to a desired pressure, the valve may be closed and the compressor or tank disconnected from the frame 130. In still another example, the frame may be pressurized by coupling the frame to the exhaust manifold of at least one of the one or more lifting fans 140 and/or propelling fans 145. It will be apparent that when using a pressurized frame configuration, all of the connecting points 240 must be sealed or closed to keep the compressed air inside the frame 130 from escaping.

In use, the at least one lifting fan 140 may be energized to create an air cushion between the pressure plate 110 and the ground surface on which the hovercraft 100 is sitting. A propelling fan 145 may also be energized to propel the hovercraft 100 across the surface of ground or water. Furthermore, a visual indicator may be generated upon damage to at least a portion of the frame 130. Examples of such visual indicators have been described herein above.

Figure 6:
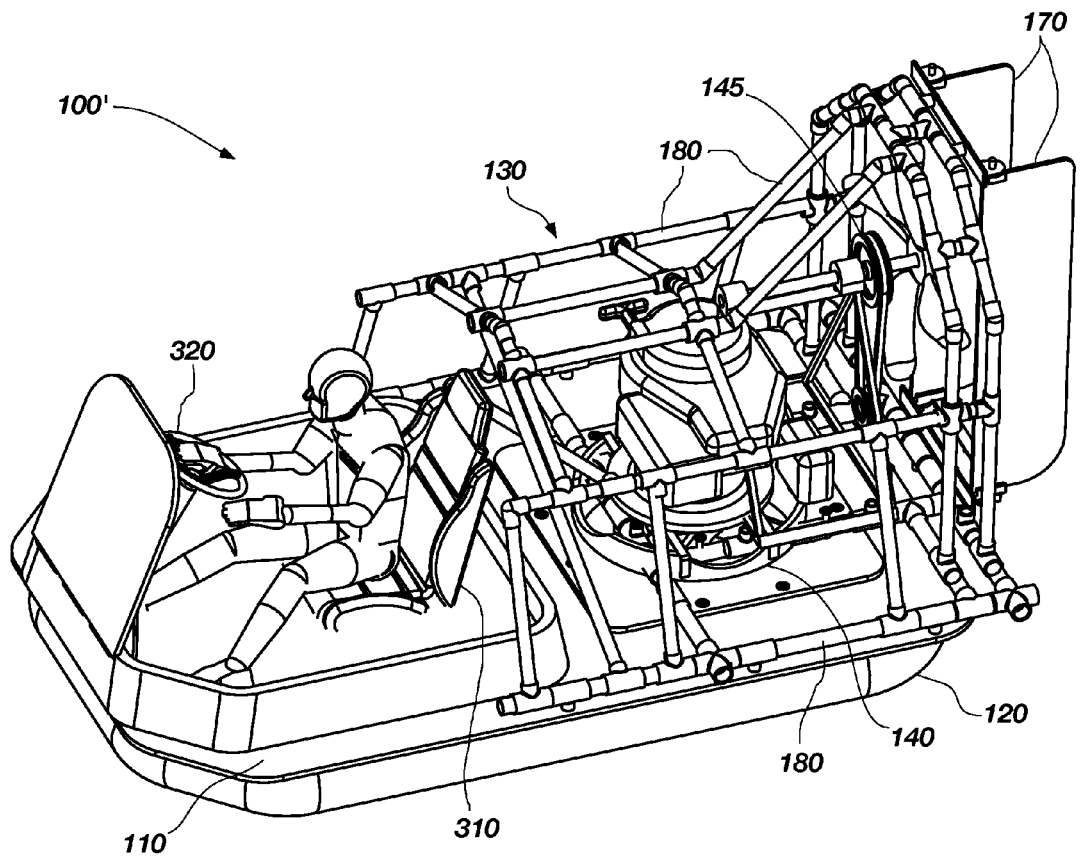
FIG. 6 illustrates a hovercraft according to one embodiment configured to carry at least one person thereon.

Although several embodiments of the hovercraft 100 may be configured to be unmanned vehicles, which may be especially useful as a movable practice target, some embodiments may be configured to carry at least one person. Such embodiments may provide, among other things, a low cost vehicle for transportation over solid and liquid surfaces. FIG. 6 illustrates a hovercraft 100' according to one embodiment configured to carry at least one person thereon. Similar to the hovercraft 100 described herein above, the hovercraft 100' comprises a pressure plate 110 comprising at least one aperture therein, a skirt 120 attached to the pressure plate 110 generally adjacent a periphery thereof defining an air chamber below the pressure plate 110, and a frame 130 coupled to the surface of the pressure plate 110 opposite from the skirt 120. The frame 130 may comprise a plurality of tubular members 180 and may be assembled to comprise a latticework over at least a portion of the pressure plate 110. At least one powered lifting fan 140 is positioned relative to the at least one aperture to generate a current of air through the aperture and into the air chamber defined by the skirt 120 and at least one propelling fan 145 is positioned and configured to propel the hovercraft 100' forward. The hovercraft 100' may further comprise one or more seats 310, a steering wheel 320 controllably coupled to the rudder 170 and one or more accelerators (not shown) coupled to at least the at least one propelling fan 145 for controlling the speed of the hovercraft 100'.

Figure 7:
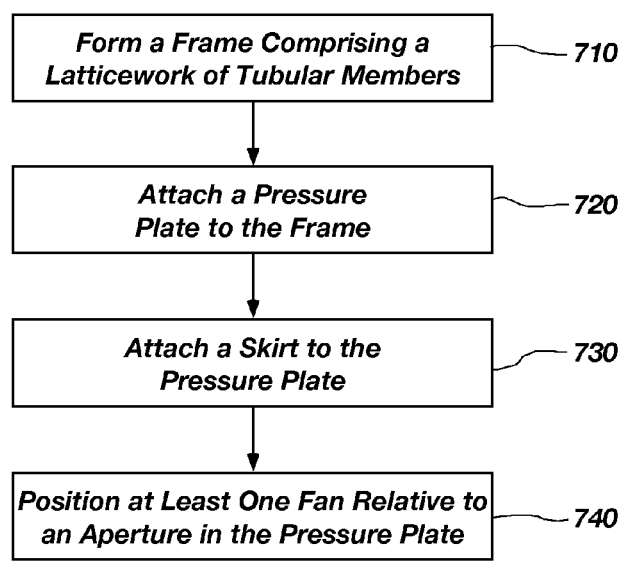
FIG. 7 is a flow diagram illustrating a method of making a hovercraft according to one embodiment of the present invention

Some embodiments of the present invention comprise methods of making an air-cushion vehicle or hovercraft. FIG. 7 is a flow diagram schematically illustrating a method of making a hovercraft according to one embodiment of the present invention. A frame may be formed comprising a latticework of tubular members 710. The frame may be formed of plastic, metal, or metal alloy tubular members as well as combinations thereof. In some embodiments, the frame is formed of PVC pipe and fittings. In some embodiments, forming the frame may comprise forming a base, forming a sidewall lattice coupled to each longitudinal side of the base and extending upward and away from the base, and forming a central lattice vertically offset from the base and coupled to and extending between the sidewall lattices. The frame may also include a propeller frame lattice as described with reference to FIG. 1 above.

A pressure plate comprising at least one aperture may be attached to the frame 720. The pressure plate may be formed of a rigid material such as, by way of example and not limitation, wood, plastic, metal, a fiberglass laminate, ceramic, or any other suitable material. The frame and the pressure plate may be coupled together using quick connects, similar to the quick connects 230 described with reference to FIG. 3. In such an embodiment, the threaded portion of a plurality of threaded tee connectors coupled to the frame may be aligned and inserted into a plurality of apertures on the pressure plate. A screw cap may then be threaded onto each of the threaded tee connector to secure the pressure plate and the frame together.

A skirt may be attached to the pressure plate adjacent to a periphery of the pressure plate 730. The skirt may be formed from any material and in any configuration known to those of ordinary skill in the art. The skirt is attached to the surface of the pressure plate opposite the frame. At least one powered lifting fan may be positioned adjacent to the at least one aperture in the pressure plate to generate a current of air through the at least one aperture 740. In some embodiments at least one propelling fan is positioned and configured to generate a current of air to propel the hovercraft laterally. One or both of the at least one powered lifting fan and the at least one propelling fan may be positioned on a portion of the frame using quick connects, as described above. In such embodiments, a plurality of apertures may be formed in a mounting surface to which the lifting and/or propelling fan may be secured. The apertures are aligned with a plurality of threaded tee connectors which are inserted into a respective aperture. A screw cap or plug may be threaded and secured on each of the threaded tee connectors to secure the mounting surface to the frame.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and legal equivalents, of the claims which follow.

What is claimed is:

1. A method of using an air-cushion vehicle, comprising:
    energizing at least one lifting fan positioned and configured to generate a current of air through an aperture in a pressure plate to lift the air-cushion vehicle sufficiently for movement;
    energizing at least one propelling fan configured to move the air-cushion vehicle; and
    generating an indicator responsive to damage to at least a portion of the air-cushion vehicle;
    wherein generating an indicator responsive to damage to at least a portion of the air-cushion vehicle comprises generating at least one visual indicator selected from the list consisting of smoke, fire, at least one light, an explosion, and cutting power to the at least one lifting fan.

2. The method of claim 1, wherein energizing the at least one lifting fan and the at least one propelling fan is effected using a remote controller.

3. The method of claim 1, further comprising repairing the damage to the at least a portion of the air-cushion vehicle by replacing damaged components.

4. The method of claim 1, further comprising controlling a path of the air-cushion vehicle remotely in use as a practice target for military ordnance.

5. A method of using an air-cushion vehicle, comprising:
    energizing at least one lifting fan positioned and configured to generate a current of air through an aperture in a pressure plate to lift the air-cushion vehicle sufficiently for movement;
    energizing at least one propelling fan configured to move the air-cushion vehicle;
    effecting damage to at least a portion of the air-cushion vehicle using ordnance; and
        generating an indicator responsive to the damage to at least a portion of the air-cushion vehicle.

6. The method of claim 5, further comprising launching the ordnance from a remote location.

7. The method of claim 5, wherein energizing the at least one lifting fan and the at least one propelling fan is effected using a remote controller.

8. The method of claim 5, further comprising repairing the damage to the at least a portion of the air-cushion vehicle by replacing damaged components.

9. The method of claim 5, further comprising controlling a path of the air-cushion vehicle remotely in use as a practice target for military ordnance.

10. A method of using an air-cushion vehicle, comprising:
    energizing at least one lifting fan positioned and configured to generate a current of air through an aperture in a pressure plate to lift the air-cushion vehicle sufficiently for movement;
    energizing at least one propelling fan configured to move the air-cushion vehicle; and
        generating an indicator responsive to damage to at least a portion of the air-cushion vehicle;
    wherein generating an indicator upon damage to at least a portion of the air-cushion vehicle comprises generating a radio signal.

11. The method of claim 10, wherein energizing the at least one lifting fan and the at least one propelling fan is effected using a remote controller.

12. The method of claim 10, further comprising repairing the damage to the at least a portion of the air-cushion vehicle by replacing damaged components.

13. The method of claim 10, further comprising controlling a path of the air-cushion vehicle remotely in use as a practice target for military ordnance.

14. A method of using an air-cushion vehicle, comprising:
    energizing at least one lifting fan positioned and configured to generate a current of air through an aperture in a pressure plate to lift the air-cushion vehicle sufficiently for movement;
    energizing at least one propelling fan configured to move the air-cushion vehicle; and
    generating an indicator responsive to damage to at least a portion of the air-cushion vehicle;
    further comprising generating the indicator responsive to a drop in pressure within at least a portion of the air-cushion vehicle responsive to the damage.

15. The method of claim 14, wherein energizing the at least one lifting fan and the at least one propelling fan is effected using a remote controller.

16. The method of claim 14, further comprising repairing the damage to the at least a portion of the air-cushion vehicle by replacing damaged components.

17. The method of claim 14, further comprising controlling a path of the air-cushion vehicle remotely in use as a practice target for military ordnance.

* * * * *